June 5, 1962      T. E. BAKER      3,037,270
AUTOMOBILE REAR AXLE PULLER
Filed Feb. 8, 1960
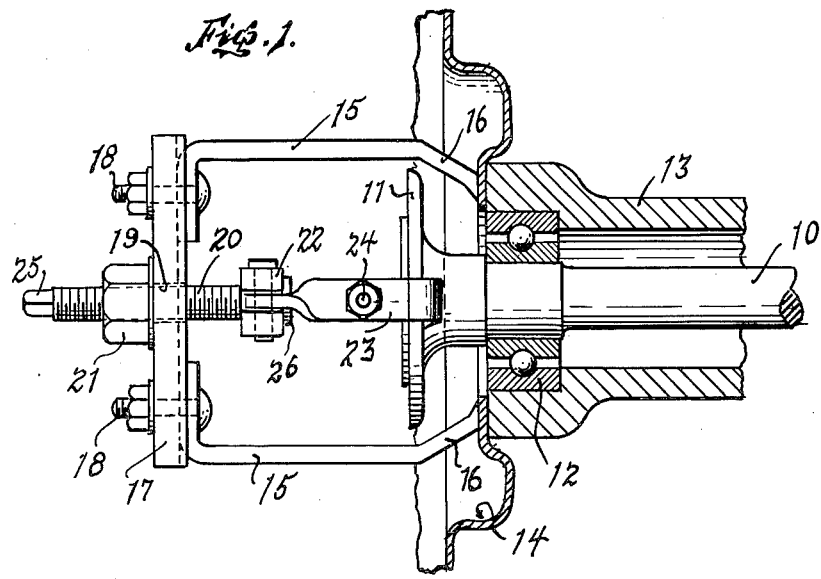
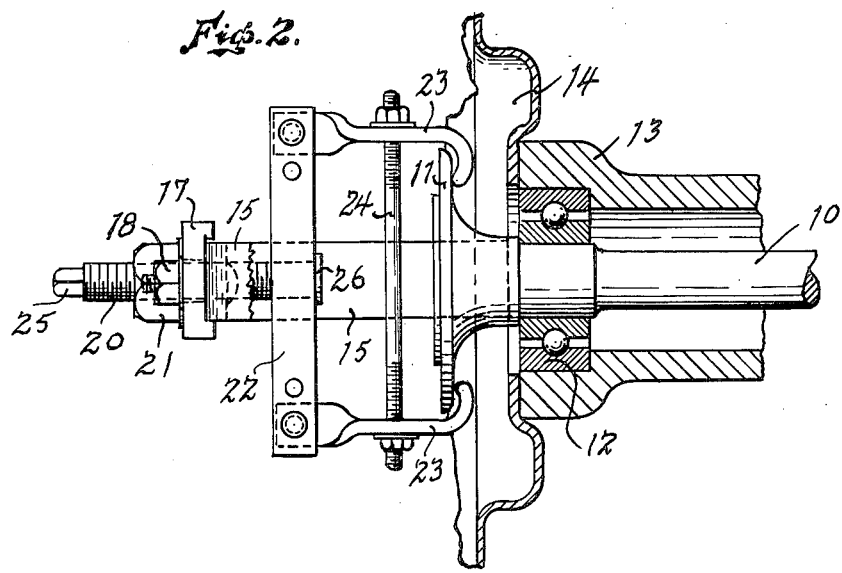
INVENTOR.
THOMAS E. BAKER.
BY
ATTORNEY

United States Patent Office 3,037,270
Patented June 5, 1962

3,037,270
AUTOMOBILE REAR AXLE PULLER
Thomas E. Baker, 306 Capitola Road, Capitola, Calif.
Filed Feb. 8, 1960, Ser. No. 7,356
1 Claim. (Cl. 29—262)

The present invention relates to an automobile repair shop tool and more particularly to a device for pulling the rear axle of an automobile in a practical and effective manner and has for an object the provision of an axle pulling device that is especially adapted to the pulling of the rear axles of automobiles having a conventional brake cylinder supporting housing that overlaps a wheel supporting flange.

Another object of the invention is to provide a practical device that may be used to withdraw a rear axle from the differential supporting housing of an automobile.

At the present time there are available several so-called shaft pulling tools which have a weight slidably mounted upon a guide rod that is secured in axial alignment at the end of a shaft or axle and operate by sliding said weight along the guide and into striking contact with an abutment at the end of the guide. In this operation the weight is manually reciprocated so that in striking said abutment there is exerted an outward impact force axially upon the axle. This operation, however, requires considerable effort on the part of the operator in manipulating the sliding weight and is time consuming. It is, therefore, a further object of my invention to provide a device which may be employed for the removal of a dry or frozen shaft in a more efficient manner.

Other object and advantages of the invention will be in part evident to those skilled in the art and in part pointed out hereinafter in connection with the accompanying drawings wherein there is shown by way of illustration and not limitation preferred embodiments of the invention.

For a better understanding of the invention reference should be had to the accompanying drawing wherein there is shown by way of illustration and not limitation a preferred embodiment of the invention.

In the drawing wherein like numerals refer to like parts through the several views:

FIGURE 1 is a top view showing my device as operating for the removal of an automobile axle having an enlarged wheel supported flange.

FIGURE 2 is a side view of the device shown in FIGURE 1 with parts broken away to reveal details of construction.

A major difficulty in removing rear axles from a number of conventional automobiles now on the market is that the axles are more generally provided with an enlarged wheel hub engaging flange that is disposed within the confines of a hydraulic brake cylinder supporting housing in such a manner that it is impossible to use a conventional present day axle pulling device. One reason for this is that the wheel supporting flange at the outer end of the axle overlaps the rear axle housing within which the differential gears are located and while the hydraulic brake cylinder supporting housing might appear to provide a base upon which a pulling action might be established, this is not the case. In other words, this brake cylinder supporting housing is of stamped metal construction and is therefore subject to distortion should any extreme pulling force be exerted directly thereupon. This is a condition which must be avoided for should the brake cylinder supporting housing be distorted even slightly the brake band and drum will be rendered out of line and therefore ineffective as a brake.

With the above in mind I have shown my invention as applied to a rear axle, designated by the numeral 10, having a wheel hub supporting flange 11 that is mounted to rotate in a conventional ball bearing assembly 12 which is carried by an axle supporting housing 13. In this showing the axle housing 13 is also shown as supporting a hydraulic brake cylinder enclosing housing 14, which as stated above, renders the use of present day axle pulling devices impractical. Because of this difficulty my improved axle pulling device is shown as having two oppositely disposed pressure exerting legs 15 having their ends bent in as at 16 to register in alignment with the end of the rear axle housing 13 and at a point where no distorting pressure can be exerted upon the brake cylinder enclosing housing 14. These legs 15 are adjustably secured to a straddle bar 17 by bolts 18 that are disposed in slots at the outer ends of the legs 15. In this instance the straddle bar 17 is provided with a central opening 19 through which a jack screw 20 extends and the jack screw 20 is shown as having a relatively large nut 21 by which axial movement thereto may be effected outwardly through the opening 19 in the straddle bar 17. At its inner end the jack screw 20 carries a laterally extended bar or support 22 which carries a pair of hinged oppositely disposed hook-like members 23 that are adapted to be positioned under or against the back of the wheel supporting flange 11 when the device is in use. In order to retain the hook-like members 23 against slipping and in effective engagement with the flange 11 I may also provide a tie-bolt 24.

The device as here disclosed is designed more particularly for pulling of axles having a relatively large wheel hub supporting flange such as the flange 11 as shown in the drawing. These axles generally do not have a nut at their ends and it is therefore difficult to use the so-called impact type of axle pulling device. While the device as here disclosed is primarily intended for employment under the condition described, it will be readily understood that there will be many other similar pulling operations for which the device will be admirably suited. In the described arrangement it will be noted that when the nut 21 is turned upon the jack screw 20 the hook supporting bar 22 will be caused to move outwardly with respect to the axle housing 13 and thus exert a pulling force upon the axle 10. In order to provide for proper positioning of the jack screw 20 with respect to any particular axle flange I have shown it as having a squared end 25 by which the jack screw may be turned independently and without unseating the nut 21 upon the straddle bar 17. As shown more clearly in FIGURE 2 the jack screw 20 extends through the supporting bar 22 and has an enlarged head 26 upon which the hub supporting bar 22 is seated, but the jack screw may if desired be threaded into the bar 22.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claim are to be considered as part of the invention.

Having thus described my invention, what I claim and desire to secure by Letters Patent is:

A tool for extracting from an axle housing an elongated axle which extends beyond the axle housing and which axle has an annular flange or the like adjacent the terminal end thereof, said tool comprising a generally inverted U-shaped frame member including a straddle bar having spaced parallel legs depending from opposite ends thereof, the lower ends of said legs converging toward each other for engaging the axle housing behind said annular flange or the like, a jack screw rotatably supported on said straddle bar between said depending legs and normal to said bar, a second bar extending between said depending legs in angular relation with respect to and beneath said straddle bar, said second bar including means rotatably receiving said jack screw therein for drawing said second bar toward said straddle bar, a pair of hook members depending from opposite ends of said second bar and terminating in lower, lateral, inwardly directed hook portion for engaging beneath the annular flange or the like, said converging lower ends of said depending legs extending a greater distance from said straddle bar than the hook members, said pair of hook members being hingedly connected on parallel axes of rotation to the opposite ends of said second bar, tie bolt means extending between intermediate portions of said hook members for retaining them in a fixed position on the annular flange or the like of the axle to be extracted, said spaced legs depending from said U-shaped frame member comprising separate elements including lateral upper end portions and in alignment with the lower converging ends of said depending legs and being disposed substantially normal in said parallel legs, said lateral upper end portions underlying said straddle bar, and fastening means extending between said lateral upper end portions of said depending legs and said straddle bar and adjustably retaining said leg portions on said straddle bar.

References Cited in the file of this patent

UNITED STATES PATENTS

| | | |
|---|---|---|
| 520,258 | Davis | May 22, 1894 |
| 1,826,631 | Payne | Oct. 6, 1931 |
| 2,262,969 | Shultz | Nov. 18, 1941 |
| 2,391,521 | Slogle | Dec. 25, 1945 |
| 2,602,989 | Akin | July 15, 1952 |
| 2,861,329 | Bishman | Nov. 25, 1958 |
| 2,870,530 | Drorak | Jan. 27, 1959 |

FOREIGN PATENTS

| | | |
|---|---|---|
| 331,320 | Great Britain | July 3, 1930 |